(12) United States Patent
Sirohi et al.

(10) Patent No.: US 12,434,825 B2
(45) Date of Patent: Oct. 7, 2025

(54) CONTROL DEVICE AND SYSTEM FOR ROTOR BLADES

(71) Applicant: BOARD OF REGENTS, THE UNIVERSITY OF TEXAS SYSTEM, Austin, TX (US)

(72) Inventors: Jayant Sirohi, Austin, TX (US); Christopher Cameron, Austin, TX (US); Palash Jain, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 18/710,812

(22) PCT Filed: Nov. 15, 2022

(86) PCT No.: PCT/US2022/049902
§ 371 (c)(1),
(2) Date: May 16, 2024

(87) PCT Pub. No.: WO2023/091389
PCT Pub. Date: May 25, 2023

(65) Prior Publication Data
US 2024/0425176 A1    Dec. 26, 2024

Related U.S. Application Data

(60) Provisional application No. 63/280,418, filed on Nov. 17, 2021.

(51) Int. Cl.
*B64C 27/605* (2006.01)
*B64C 27/37* (2006.01)

(52) U.S. Cl.
CPC ............ *B64C 27/605* (2013.01); *B64C 27/37* (2013.01)

(58) Field of Classification Search
CPC ....... B64C 11/04; B64C 11/06; B64C 11/065; B64C 11/30; B64C 11/32; B64C 11/305;
(Continued)

(56) References Cited

U.S. PATENT DOCUMENTS 2,684,722 A * 7/1954 Perry .................... B64C 27/625
416/164
9,663,236 B1 * 5/2017 Shiosaki ................. B64C 11/20
(Continued)

FOREIGN PATENT DOCUMENTS

| DE | 102013111114 A1 * | 4/2015 | ........... B64C 27/605 |
| DE | 102013111114 B4 | 1/2016 | |
| WO | WO-2019097425 A1 * | 5/2019 | ............. B64C 11/06 |

OTHER PUBLICATIONS

International Search Report and Written Opinion received in PCT/US2022/049902 mailed Mar. 14, 2023.
(Continued)

*Primary Examiner* — Courtney D Heinle
*Assistant Examiner* — Ryan C Clark
(74) *Attorney, Agent, or Firm* — Meunier Carlin & Curfman LLC (57) ABSTRACT

Various implementations include a rotor control device including a shaft extending along a rotational axis, a hub, first and second pitch control components, and a swashplate. The hub has a hub axis and is hingedly coupled to the shaft such that the hub axis is perpendicular to the rotational axis and stationary relative to the shaft. The hub is hingable about the hub axis relative to the rotational axis. The first pitch control component is coupled to the hub. The swashplate has the second pitch control component hingedly engaging the first pitch control component. The swashplate is movable along a swashplate plane transverse to the rotational axis. The shaft is rotatable about the rotational axis relative to the swashplate. Movement of the swashplate along the swash- (Continued)

plate plane relative to the rotational axis causes the hub to periodically hinge about the hinge axis as the hub rotates about the rotational axis.

20 Claims, 10 Drawing Sheets

(58) Field of Classification Search
CPC ..... B64C 11/306; B64C 11/308; B64C 11/34; B64C 13/18; B64C 13/16
See application file for complete search history.

(56) References Cited

U.S. PATENT DOCUMENTS

| | | | | |
|---|---|---|---|---|
| 2015/0375858 | A1* | 12/2015 | Cupp, Sr. | B64C 27/54 244/39 |
| 2018/0362146 | A1* | 12/2018 | Klein | B64U 10/13 |
| 2019/0118941 | A1* | 4/2019 | Iskrev | B64C 11/32 |
| 2020/0140073 | A1* | 5/2020 | LeGrand | B64C 27/41 |
| 2021/0291976 | A1* | 9/2021 | Eglin | B64C 27/22 |

OTHER PUBLICATIONS

Norberg, R. A°., "Autorotation, Self-Stability, and Structure of Single-Winged Fruits and Seeds (Samaras) With Comparative Remarks on Animal Flight," Biological Reviews, vol. 48, (4), Nov. 1973, pp. 561-596. doi: 10.1111/j.1469-185X.1973.tb01569.x.

Lee, E.-J. and Lee, S.-J., "Effect of initial attitude on au-torotation flight of maple samaras (*Acer palmatum*)," Journal of Mechanical Science and Technology, vol. 3, (2), 2016, pp. 741-747.

Lentink, D., Dickson, W. B., van Leeuwen, J. L., and Dickinson, M. H., "Leading-Edge Vortices Elevate Lift of Autorotating Plant Seeds," Science, vol. 324, (5933), 2009, pp. 1438-1440. doi: 10.1126/science.1174196.

Crimi, P., "Analysis of Samara-Wing Decelerator Steady-State Characteristics," Journal of Aircraft, vol. 25, (1), Jan. 1988, pp. 41-47.

Kline, R. and Koenig, W., "Samara type decelerators," Proceedings of the 8th Aerodynamic Decelerator and Balloon Technology Conference, 1984. doi: doi:10.2514/6.1984-807.

Peters, D. A. and He, C., "Modification of Mass-Flow Parameter to Allow Smooth Transition Between Helicopter and Windmill States," Journal of the American Helicopter Society, vol. 51, (3), 2006, pp. 275-278.

Senter, "Dynamics of Systems that Include Wings in Autorotation," Journal of Spacecraft and Rockets, vol. 3, (1), Jun. 1999, pp. 248-254.

Costello, M. and Beyer, E., "Performance of a Projectile/Rotor Kinetic Energy Reduction System," Proceedings of the AHS UAV 2007, Oct. 2007.

Brindejonc, A., Sirohi, J., and Chopra, I., "Design and Testing of an Autorotative Payload Delivery System," Journal of the American Helicopter Society, vol. 12, (3), Oct. 2007, pp. 245-257.

Bartz, J. and Miklosovic, D. S., "An Experimental Analysis of Camber Effects of a 6-Bladed Flapped Autorotational Aerodynamic Decelerator," 17th AIAA Aerodynamic Decelerator Systems Technology Conference and Seminar, Monetery, CA, May 19-22, 2003.

Seter, D. and Rosen, A., "Theoretical and Experimental Study of Axial Autorotation of Simple Rotary Decelerators," Journal of Aircraft, vol. 51, (1), Jan.-Feb. 2014, pp. 236-248.

Virterna, L. A. and Corrigan, R. D., "Fixed Pitch Rotor Performance of Large Horizontal Axis Wind Turbines," NASA Large Horizontal-Axis Wind Turbines Workshop, Cleveland, Ohio, Jul. 28-30, 1982.

Pitt, D. M. and Peters, D. A., "Theoretical prediction of dynamic-inflow derivatives," Sixth European Rotorcraft and Powered Lift Aircraft Forum Sep. 16-19, 1980, Bristol, England.

* cited by examiner

CONTROL DEVICE AND SYSTEM FOR ROTOR BLADES

CROSS-REFERENCE TO RELATED APPLICATIONS

This application is a U.S. National Stage application filed under 35 U.S.C. § 371 of P.C.T. Application No. PCT/US2022/049902 filed Nov. 15, 2022, and claims the benefit of U.S. Provisional Application No. 63/280,418 filed Nov. 17, 2021, each of which is incorporated herein by reference in their entirety.

STATEMENT OF GOVERNMENT INTEREST

This invention was made with Government support under Grant no. FA8649-21-P-0644 awarded by the United States Air Force, and Grant no. W56KGU-17-C-0027 awarded by the Army Research Laboratory. The Government has certain rights in the invention.

BACKGROUND

Current autorotative devices include rotor blades that are deployable. The rotor blades act like a parachute to decelerate the device's descent. However, these autorotative devices are uncontrolled such that the devices descend without any guidance. Thus, the area at which these devices land is undeterminable.

Current powered rotor systems, such as those on helicopters, include a complex control system design that moves a swashplate in three-dimensions to cause a periodic change in the pitch of the blades. These complex systems include many moving parts that are subject to failure and add extra weight to the system.

Thus, a need exists for a simplified control device and system for altering the pitch of rotor blades to control the trajectory of the rotor system.

SUMMARY

Various implementations include a rotor control device including a rotational axis, a shaft, a hub, at least one first pitch control component, and a swashplate. The shaft extends along the rotational axis. The hub has a hub axis. The hub is hingedly coupled to the shaft such that the hub axis is perpendicular to the rotational axis and stationary relative to the shaft. The hub is hingable about the hub axis relative to the rotational axis. The at least one first pitch control component is coupled to the hub. The swashplate has at least one second pitch control component hingedly engaging the at least one first pitch control component. The swashplate is movable along a swashplate plane transverse to the rotational axis. The shaft is rotatable about the rotational axis relative to the swashplate. Movement of the swashplate along the swashplate plane relative to the rotational axis causes the hub to periodically hinge about the hinge axis as the hub rotates about the rotational axis.

In some implementations, the rotor control device further includes one or more blades coupled to the hub and extendable along the hub axis. In some implementations, the one or more blades includes two blades. In some implementations, each of the one or more blades is hingedly coupled to the hub. In some implementations, each of the one or more blades includes a first blade hinge and a second blade hinge. In some implementations, the first blade hinge is coupled to the hub, the second blade hinge is coupled to the first blade hinge, and the blade is coupled to the second blade hinge.

In some implementations, the rotor control device further includes at least one servo for moving the swashplate along the swashplate plane. In some implementations, the at least one servo includes two servos.

In some implementations, the at least one first pitch control component includes two first pitch control components. In some implementations, the at least one second pitch control component includes two second pitch control components.

In some implementations, one of the first pitch control component and the second pitch control component includes at least one pin extending transverse to the rotational axis. In some implementations, the other of the second pitch control component and the first pitch control component includes at least one slot for slidingly and hingedly receiving the at least one pin.

In some implementations, the swashplate includes an outer body and an inner body. In some implementations, the inner body is rotatable about the rotational axis relative to the outer body. In some implementations, the at least one second pitch control component extends from the inner body. In some implementations, the inner body defines a swashplate opening through which the shaft extends. In some implementations, the swashplate opening is sized such that the swashplate can move along the swashplate plane enough to allow the hub to hinge up to 30 degrees relative to the swashplate plane as the hub rotates about the rotational axis.

In some implementations, the rotor control device further includes a controller. In some implementations, the controller includes a processor and a system memory. In some implementations, the processor executes computer-readable instructions stored on the system memory. In some implementations, the instructions cause the processor to cause the swashplate to move along the swashplate plane.

In some implementations, the rotor control device further includes an inertial measurement unit in operable communication with the processor. In some implementations, the processor receives an input signal from the inertial measurement unit. In some implementations, the processor causes the swashplate to move along the swashplate plane based on the input signal.

In some implementations, the rotor control device further includes an altimeter in operable communication with the processor. In some implementations, the processor receives an input signal from the altimeter. In some implementations, the processor causes the swashplate to move along the swashplate plane based on the input signal.

In some implementations, the rotor control device further includes a global positional system (GPS) in operable communication with the processor. In some implementations, the processor receives an input signal from the GPS. In some implementations, the processor causes the swashplate to move along the swashplate plane based on the input signal.

In some implementations, the rotor control device further includes a camera in operable communication with the processor. In some implementations, the processor receives an input signal from the camera. In some implementations, the processor causes the swashplate to move along the swashplate plane based on the input signal.

In some implementations, the rotor control device further includes a receiver in operable communication with the processor. In some implementations, the processor receives an input signal from the receiver. In some implementations, the processor causes the swashplate to move along the swashplate plane based on the input signal.

Various other implementations include an autorotative system. The system includes a main body and a rotor control device, as described above, coupled to the main body. The shaft and the hub are rotatable relative to the main body. The swashplate is non-rotatable relative to the main body.

In some implementations, the rotor control device further includes a motor for causing the shaft to rotate about the rotational axis.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods disclosed herein provide for controlling the trajectory of descent of a rotor system, such as on an autorotative device or a motorized device. The devices, systems, and methods disclosed herein can periodically change the pitch of the blades of the rotor device as the blades rotate around a rotational axis such that the blades create a lateral force in a desired direction and magnitude. This lateral force alters the normal trajectory of the descent of the rotor system such that the descent of the rotor system can be controlled. The control system includes a swashplate that moves in a two-dimensional plane, rather than a three-dimensional space, to reduce the complexity of the device. The devices, systems, and methods disclosed herein provide for a fully autonomous control system or a manually controlled system.

The devices, systems, and methods disclosed herein further provide for blades coupled to a dual-hinge deployment mechanism that allow for the entire device to be carried with the blades in a folded/stowed position (e.g., on an aircraft). When the device and/or system is deployed in flight, the blades are passively deployed, and the control mechanism is able to alter the trajectory of the descent of the device and/or system.

Various implementations include a rotor control device including a rotational axis, a shaft, a hub, at least one first pitch control component, at least one second pitch control component, and a swashplate. The shaft extends along the rotational axis. The hub has a hub axis. The hub is hingedly coupled to the shaft such that the hub axis is perpendicular to the rotational axis and stationary relative to the shaft. The hub is hingable about the hub axis relative to the rotational axis. The at least one first pitch control component is coupled to the hub. The swashplate has the at least one second pitch control component hingedly engaging the at least one first pitch control component. The swashplate is movable along a swashplate plane transverse to the rotational axis. The shaft is rotatable about the rotational axis relative to the swashplate. Movement of the swashplate along the swashplate plane relative to the rotational axis causes the hub to periodically hinge about the hinge axis as the hub rotates about the rotational axis.

FIGS. 1-10 show a rotor control device 100, according to one implementation. The device 100 includes a shaft 106 extending along a rotational axis 108, a hub 102 hingedly coupled to the shaft 106, two blades 130, two first pitch control components 160, two second pitch control components 164, a swashplate 104, two servo motors 170, and a controller 200. The device 100 can also be coupled to a main body (not shown) to perform as a controlled autorotative device.

As shown in FIGS. 1-3, 7, and 9A-9E, the hub 102 includes a hub body 110 and a hub coupler 124. The hub body 110 has a first side 112, a second side 114 opposite and spaced apart from the first side 112, a first end 116, and a second end 118 opposite and spaced apart from the first end 116, and a hub axis 120 extending between the first end 116 and the second end 118. The first side 112 of the hub body 110 defines a central hub opening 122 centered on the hub axis 120 and the rotational axis 108 and extending from the first side 112 to the second side 114.

The hub coupler 124 is disposed within the central hub opening 122 and is hingably coupled to the hub body 110 such that the hub coupler 124 is rotatable about the hub axis 120 relative to the hub body 110. The hub coupler 124 defines a shaft opening 126 through which the shaft 106 is disposed. The hub coupler 124 is coupled to the shaft 106 such that the hub axis 120 is perpendicular to the rotational axis 108. Thus, the hub body 110 is hingable about the hub axis 120 relative to the rotational axis 108.

Although the hub coupler 124 is shown in FIGS. 1-3, 7, and 9A-9E as a collar for statically or stationarily coupling the hub coupler 124 to the shaft 106, in other implementations, the hub coupler includes a bearing and is rotatably coupled to the shaft such that the hub coupler, and thus the hub body, are rotatable about the rotational axis relative to the shaft. In some implementations, the hub coupler does not include a bearing and is rotatably coupled to the shaft.

A first blade 130 is hingedly coupled to the first end 116 of the hub body 110, and a second blade 130 is hingedly coupled to the second end 118 of the hub body 110, as shown in FIGS. 1, 3, and 9A-9E. The first and second blades 130 are extendable along the hub axis 120. Although the device 100 of FIGS. 1, 3, and 9A-9E includes two blades 130, in other implementations, the device includes only one blade or three or more blades. In such implementations, the hub body includes any number of necessary ends of the hub body to which the blades are coupled and any necessary number of hub axes.

Figure 1:
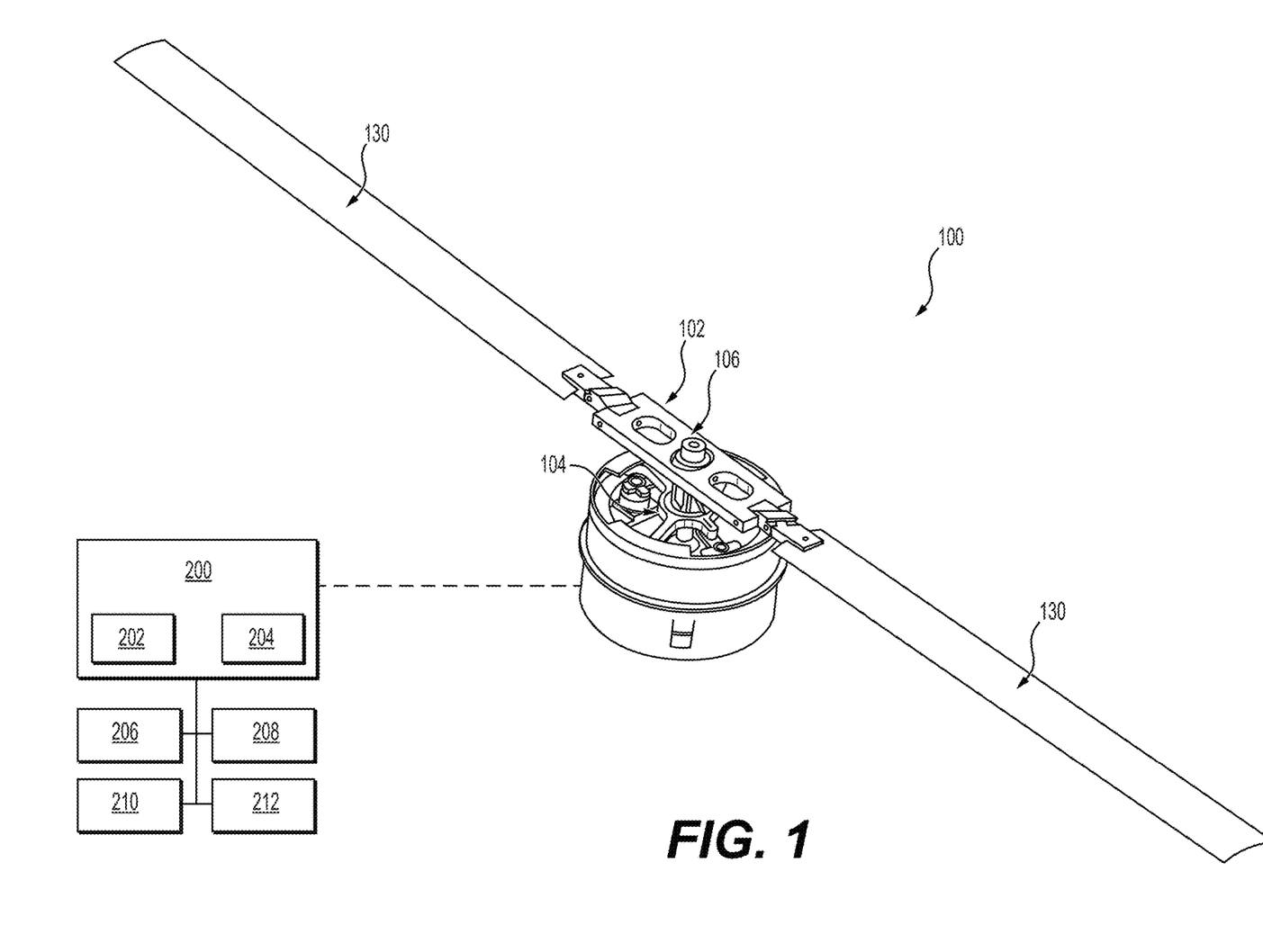
FIG. 1 is a perspective view of a rotor control device, according to one implementation.
Figure 2:
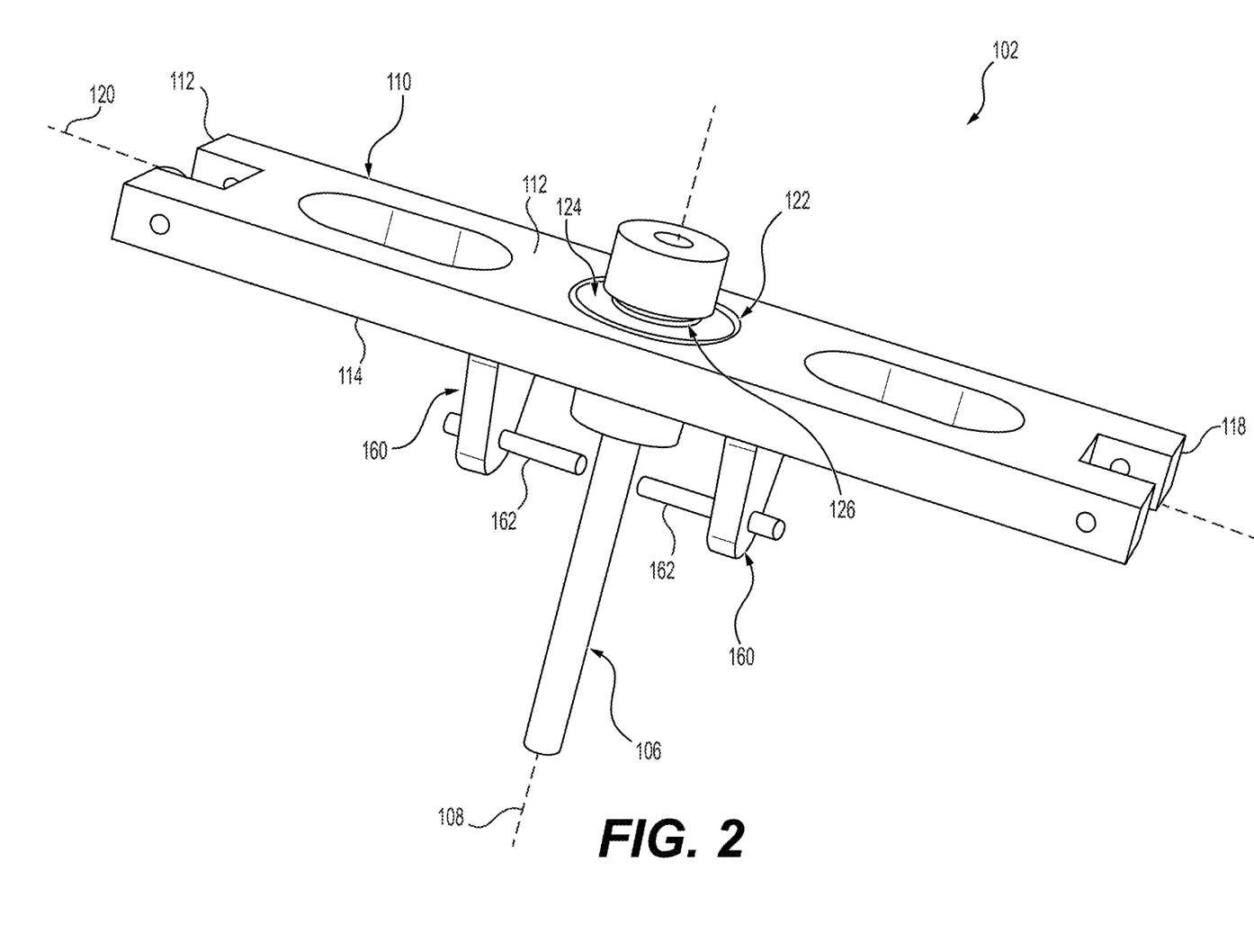
FIG. 2 is a perspective view of the hub and shaft of the rotor control device of FIG. 1.
Figure 3:
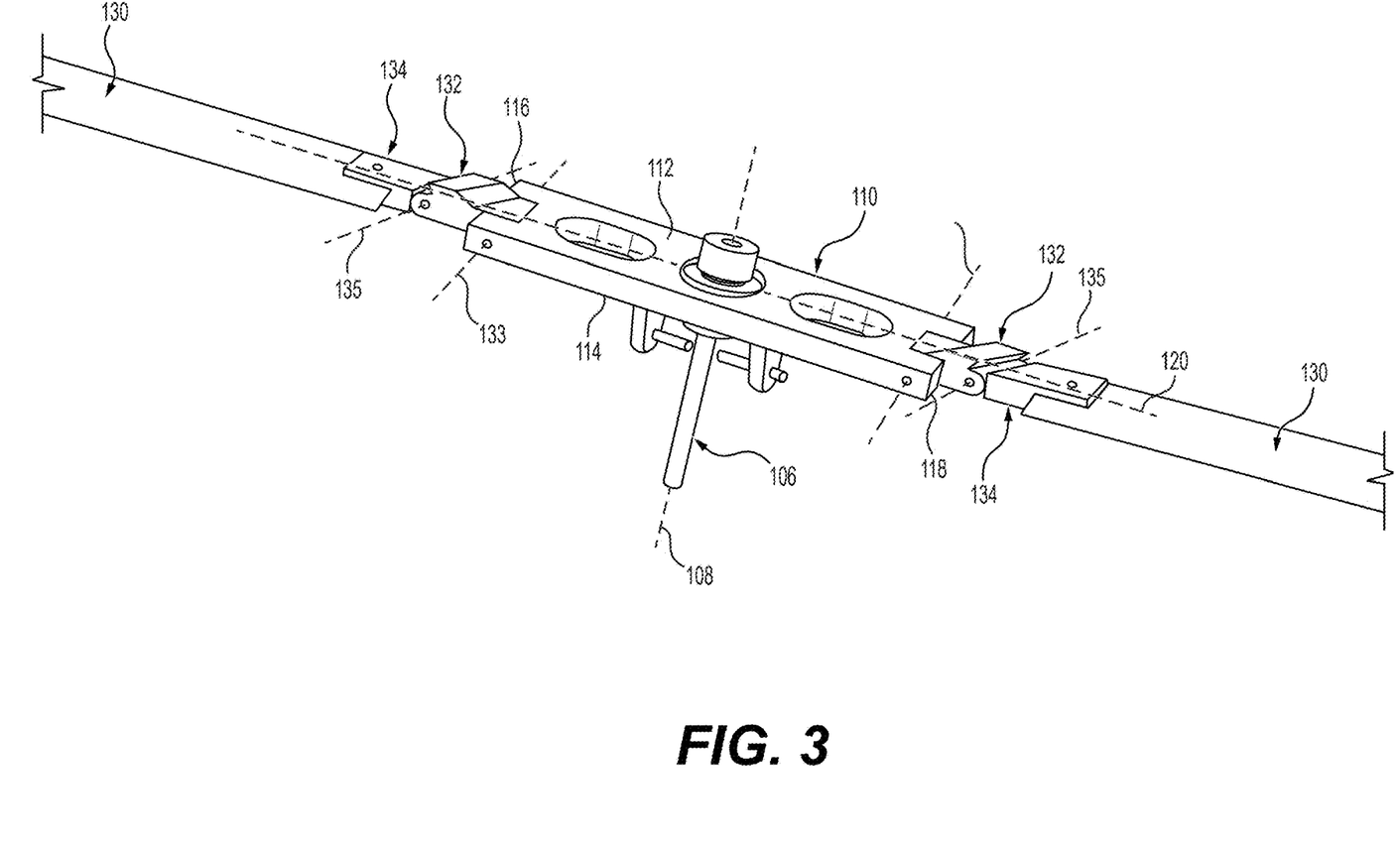
FIG. 3 is a perspective view of the hub, shaft, and blades of the rotor control device of FIG. 1.

Each of the first and second blades 130 includes a first blade hinge 132 and a second blade hinge 134. The first blade hinge 132 is hingedly coupled to an end 116, 118 of the hub body 110. The first blade hinge 132 is hingable relative to the end 116, 118 of the hub body 110 along an axis 133 that is perpendicular to the hub axis 120 and is extendable along a plane that is perpendicular to the rotational axis 108. The second blade hinge 134 is hingedly coupled to the first blade hinge 132. The second blade hinge 134 is hingable relative to the first blade hinge 132 along an axis 135 that forms an oblique angle with the hub axis 120 and is extendable along a plane that is perpendicular to the rotational axis 108. The blade 130 is hingedly coupled to the second blade hinge 134. The blade 130 is rigidly coupled to the second blade hinge 134.

When the device 100 is deployed, the blades 130 are hinged to a position such that a longitudinal axis of each of the blades 130 is substantially parallel to the rotational axis 108. As the device 100 begins its descent, the drag from the atmosphere causes the blades 130 to hinge radially outwardly and causes the blades 130, hub 102, and shaft 106 to begin to rotate about the rotational axis 108. As the rotational speed of the blades 130 increases, the centrifugal forces of the blades 130 causes the hingable blades 130 to stabilize in a radially outward position along the hub axis 120. The drag caused by the rotating blades 130 reduces the speed of the descent of the device 100.

The swashplate 104 has an outer body 140 and an inner body 150, as shown in FIGS. 1 and 4-7. The outer body 140 of the swashplate 104 has a first side 142 and a second side 144 opposite and spaced apart from the first side 142. The first side 142 of the outer body 140 of the swashplate 104 defines an outer body opening 146 extending from the first side 142 to the second side 144 of the outer body 140 of the swashplate 104.

The inner body 150 of the swashplate 104 is disposed within the outer body opening 146 and is rotatably coupled to the outer body 140 of the swashplate 104 such that the inner body 150 of the swashplate 104 is rotatable about the rotational axis 108 relative to the outer body 140 of the swashplate 104. The inner body 150 of the swashplate 104 defines a swashplate opening 152 through which the shaft 108 is disposed.

The outer body 140 of the swashplate 104 is slidably captured within a swashplate guide 154. The swashplate guide 154 is larger in a radial direction relative to the rotational axis 108 than the swashplate 104 such that the swashplate 104 is movable along a swashplate plane 156 that is transverse to the rotational axis 108. The swashplate opening 152 of the inner body 150 of the swashplate 104 is large enough such that the swashplate 104 can be moved within the swashplate guide 154 in any direction along the swashplate plane 156 without the inner body 150 of the swashplate 104 contacting the shaft 106.

In implementations in which the device is coupled to a main body to perform as an autorotative system, the swashplate is non-rotatable relative to the main body, and the shaft, the hub, and the blades are rotatable relative to the main body and swashplate. In some implementations, both the swashplate and shaft are non-rotatable relative to the main body, and the hub and the blades are rotatable relative to the main body, swashplate, and shaft.

In some implementations, the shaft of the device is coupled to a motor to cause the shaft, hub, and blades to rotate about the rotational axis. In such implementations, the blades create lift such that the device can fly or further decrease the device's descent speed.

Each of the two first pitch control components 160 are coupled to and extend from the second side 118 of the hub body 110. Each of the first pitch control components 160 includes a pin 162 extending transverse to the rotational axis 108.

Each of the two second pitch control components 164 are coupled to and extend from the inner body 150 of the swashplate 104. Each of the second pitch control components 164 defines a groove 166 through which one of the pins 162 of the first pitch control components 160 extends, slidably and hingedly engaging each of the first pitch control components 160 to one of the second pitch control components 164.

Thus, as the hub 102 rotates relative to the outer body 140 of the swashplate 104, the first pitch control components 160 coupled to the hub 102 cause the second pitch control components 164 and the inner body 150 of the swashplate 104 to also rotate.

Although the device 100 shown in FIGS. 1-9E includes two first pitch control components 160 and two second pitch control components 164, in other implementations, the device includes any number of first and second pitch control components. In some implementations, the first pitch control components define grooves, and the second pitch control components include pins disposed within the grooves of the first pitch control components. Although the second pitch control components 164 shown in FIGS. 1-9E define grooves 166, in other implementations, the second pitch control components include slots, channels, or any other feature capable of hingedly and slidably engaging the pin of the first pitch control components. Although the first pitch control components 160 shown in FIGS. 1-3, 7, and 9A-9E include pins 162, in other implementations, the first pitch control components could include any feature capable of hingedly and slidably engaging the groove of the second pitch control components.

Figure 8:
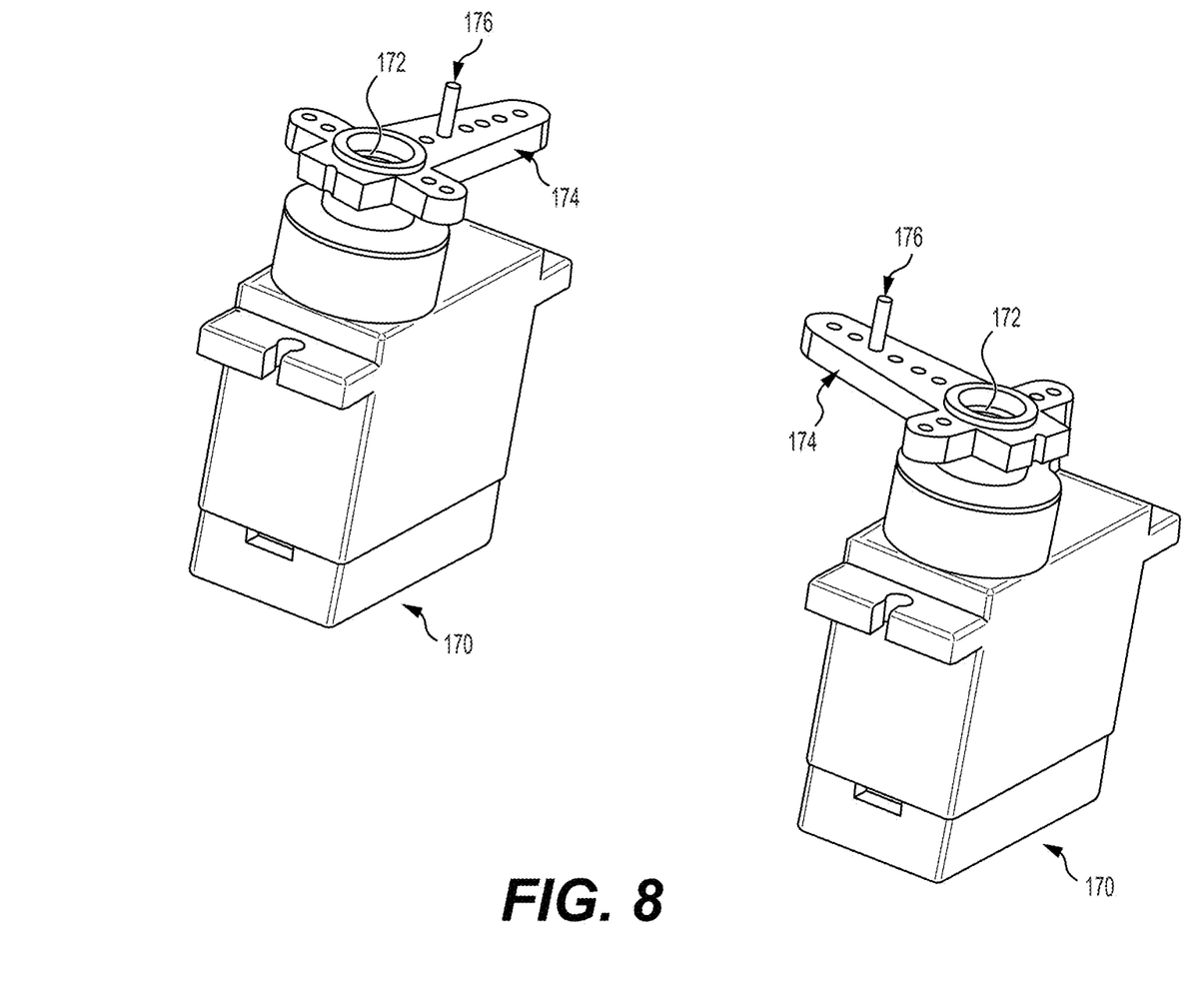
FIG. 8 is a perspective view of the servo motors of the rotor control device of FIG. 1.

The output shaft 172 of each of the servo motors 170 extend perpendicularly to the swashplate plane 104, as shown in FIG. 8. Each output shaft 172 is statically coupled to a separate servo arm 174 such that the servo arm 174 extends radially outwardly from the output shaft 172 and rotates with the output shaft 172. Each of the servo arms 174 further includes a servo arm pin 176 extending perpendicularly to the swashplate plane 156.

Figure 4:
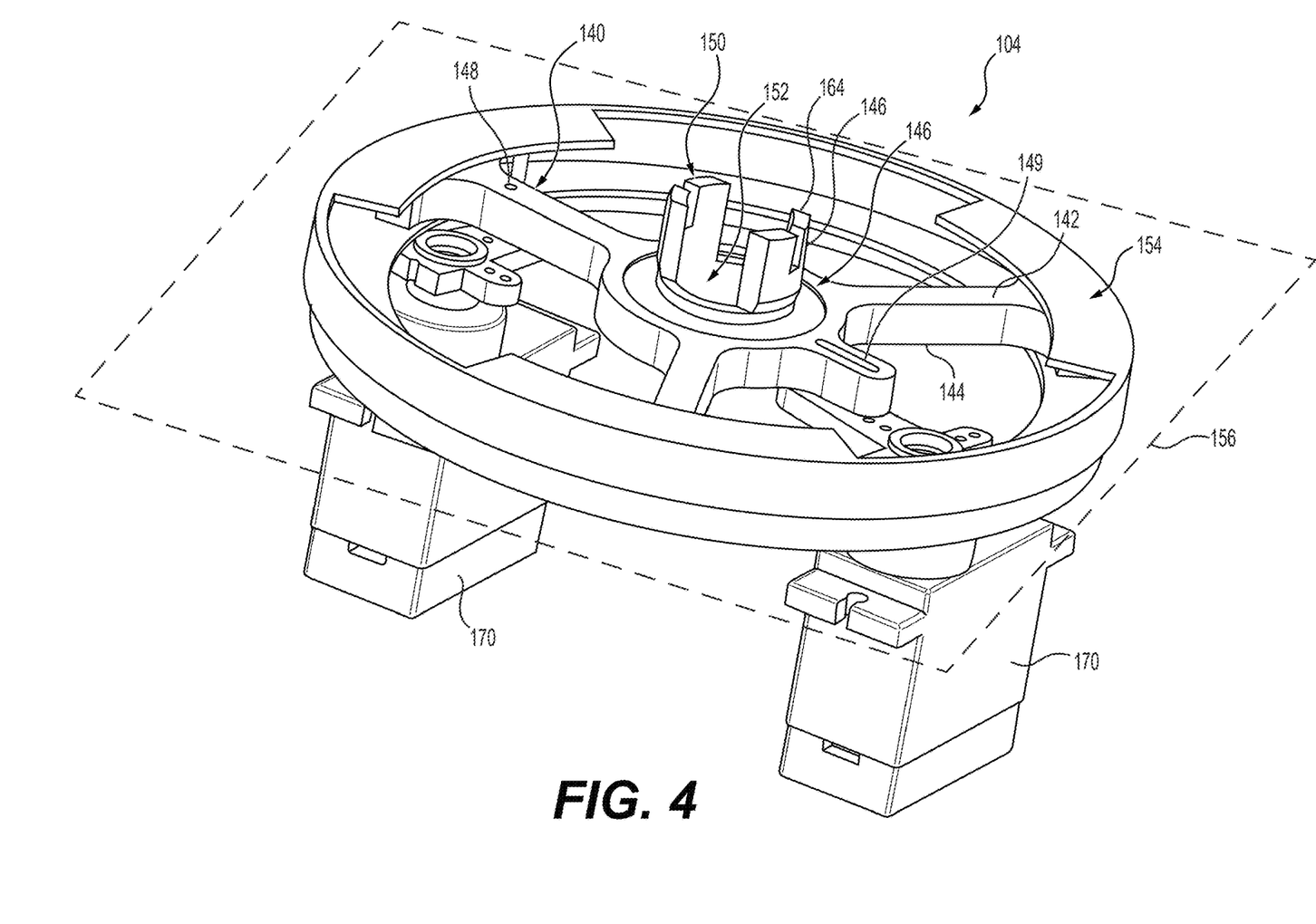
FIG. 4 is a perspective view of the swashplate and servo motors of the rotor control device of FIG. 1.
Figure 5:
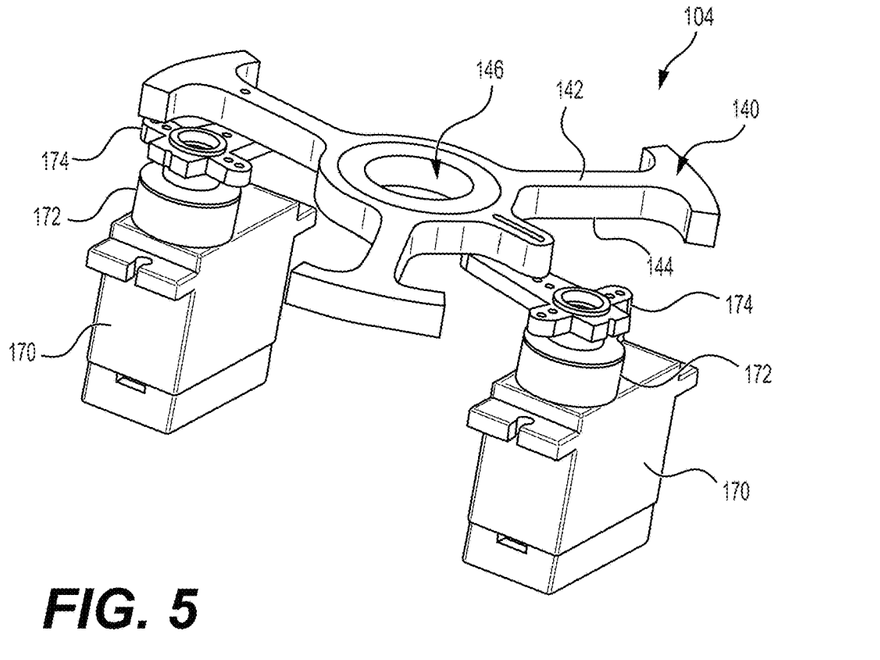
FIG. 5 is another perspective view of the swashplate and servo motors of the rotor control device of FIG. 1.
Figure 6:
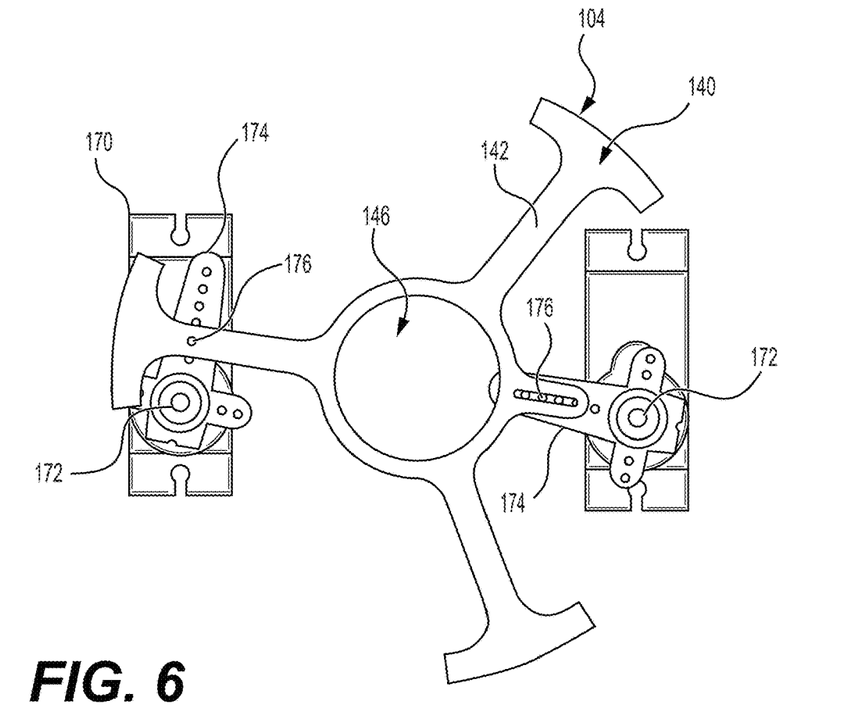
FIG. 6 is a top view of the swashplate and servo motors shown in FIG. 5
Figure 7:
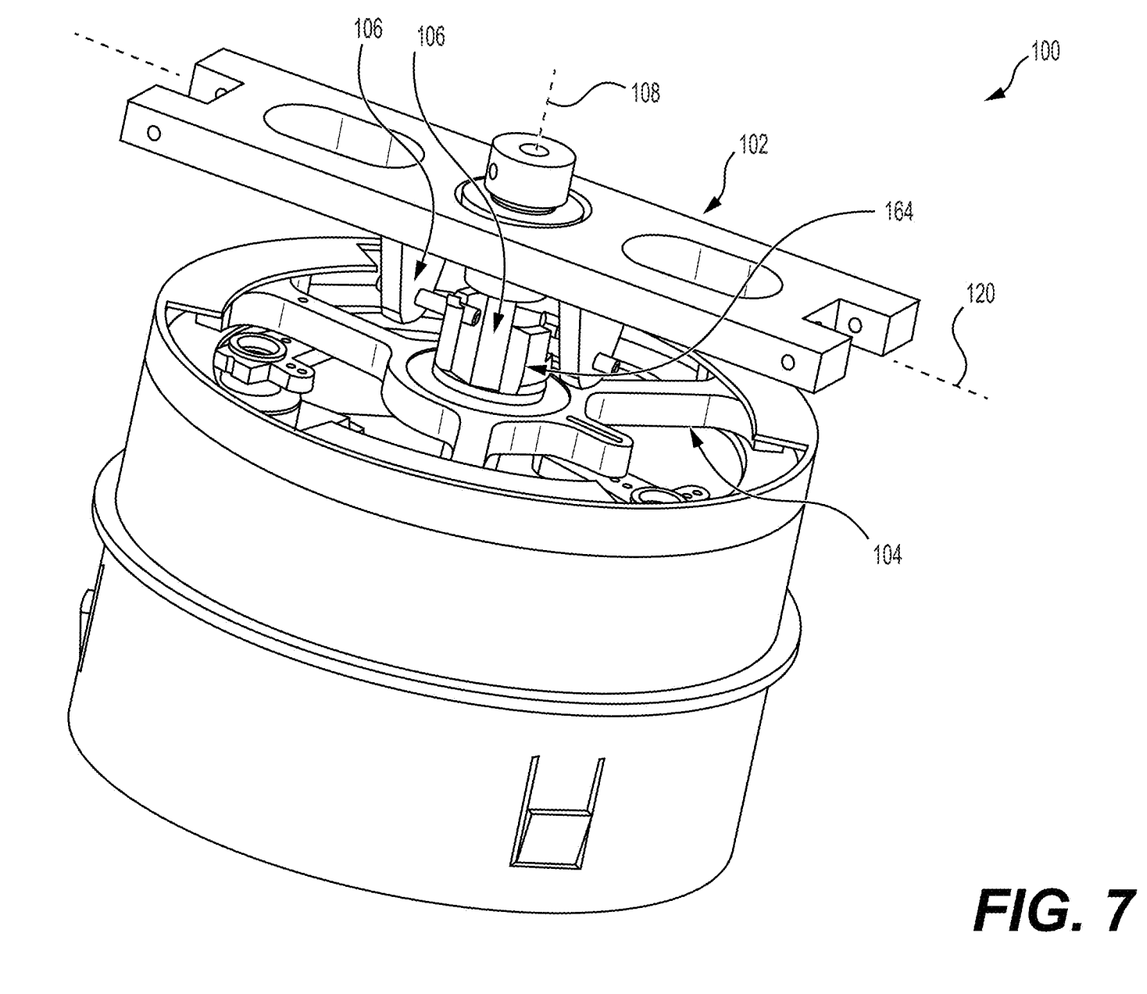
FIG. 7 is a perspective view of the hub, shaft, swashplate and servo motors of the rotor control device of FIG. 1.

The first side 142 of the outer body 140 of the swashplate 104 defines a servo pin opening 148 and a servo pin slot 149, each extending to the second side 144 of the outer body 140 of the swashplate 104. One of the servo arm pins 176 is rotationally disposed within the servo pin opening 148, and the other of the servo arm pins 176 is rotationally and slidably disposed within the servo pin slot 149, as shown in FIGS. 4-6. The rotation of the output shafts 172 of the servo motors 170 causes the servo arms 174 to rotate such that the servo arm pins 176 disposed within the servo pin opening 148 and servo pin slot 149 cause the swashplate 104 to move along the swashplate plane 156.

The rotation of the servo motors 170 can be coordinated to cause the swashplate 104 to move a predetermined distance in any direction along the swashplate plane 156 to move the swashplate 104 to a predetermined position to control the trajectory of the descent of the device 100.

As the swashplate 104 moves along the swashplate plane 156, the second pitch control components 164 coupled to the swashplate 104 also move parallel to the swashplate plane 156. Because the first pitch control components 160 are coupled to the hub body 110, and the pins 162 of the first pitch control components 160 are hingedly and slidably engaging the grooves 166 of the second pitch control components 164, movement of the second pitch control components 164 parallel to the swashplate plane 156 also causes the hub body 110 to periodically hinge about the hub axis 120 as the hub 102 rotates about the rotational axis 108. The periodical hinging of the hub 102 causes a periodic change in the pitch of the blades 130.

Figure 9A:
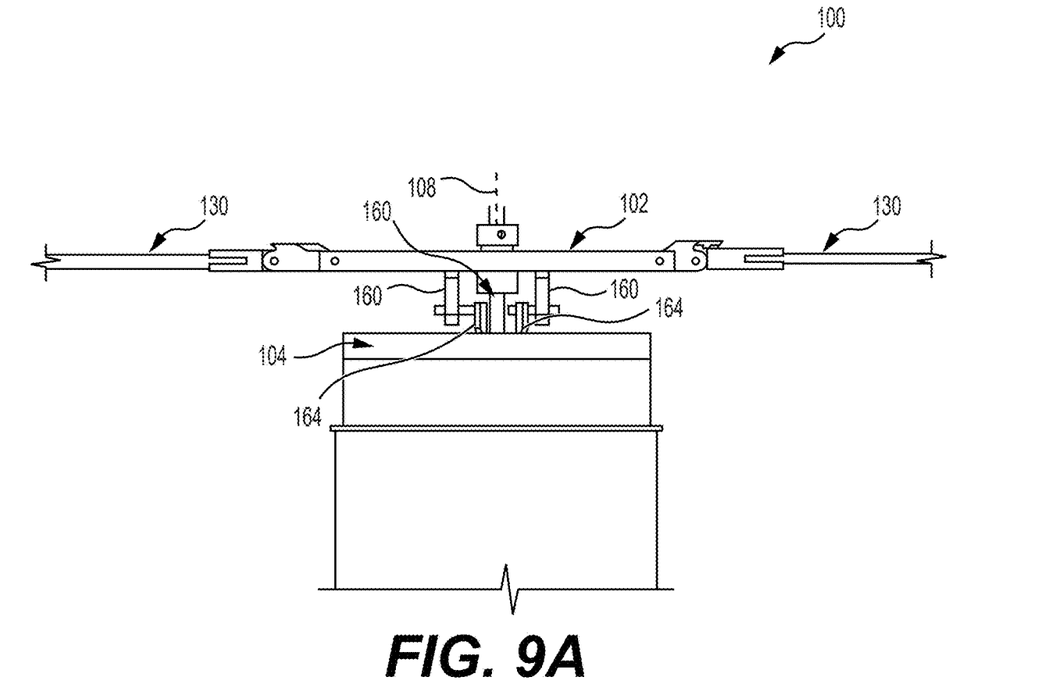
FIG. 9A is a side view of the rotor control device of FIG. 1 in which the swashplate is in a neutral position and the hub is rotated to a first position.
Figure 9B:
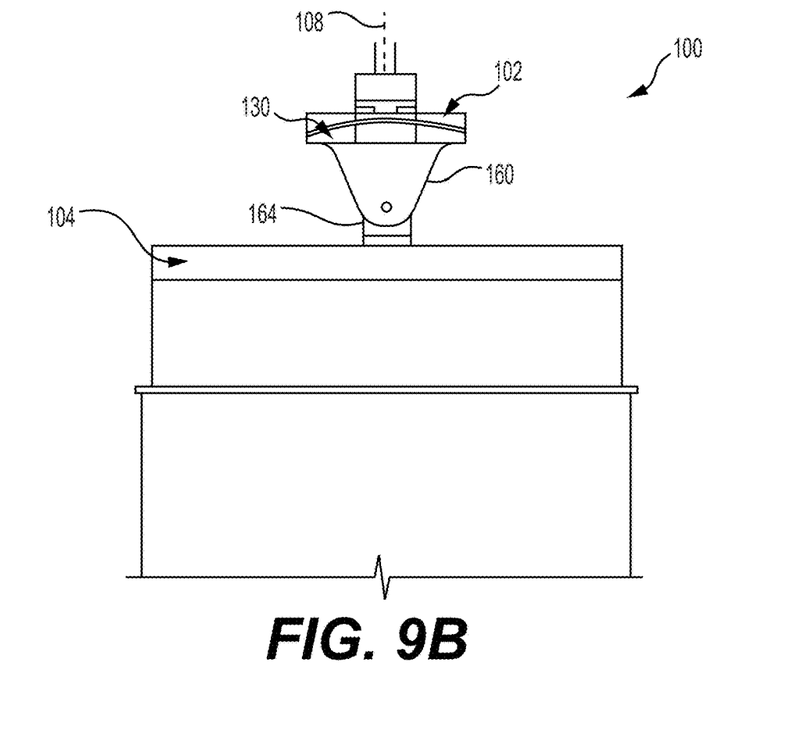
FIG. 9B is a side view of the rotor control device of FIG. 1 in which the swashplate is in the neutral position and the hub is rotated to a second position perpendicular to the first position.

When the swashplate 104 is located in a central location relative to the rotational axis 108, as shown in FIGS. 9A and 9B, the pitches of the first blade 130 and the second blade 130 remain equal in a neutral position as the blades 130 rotate. Thus, gravity and other external forces will cause the device 100 to descend along a normal trajectory.

Figure 9C:
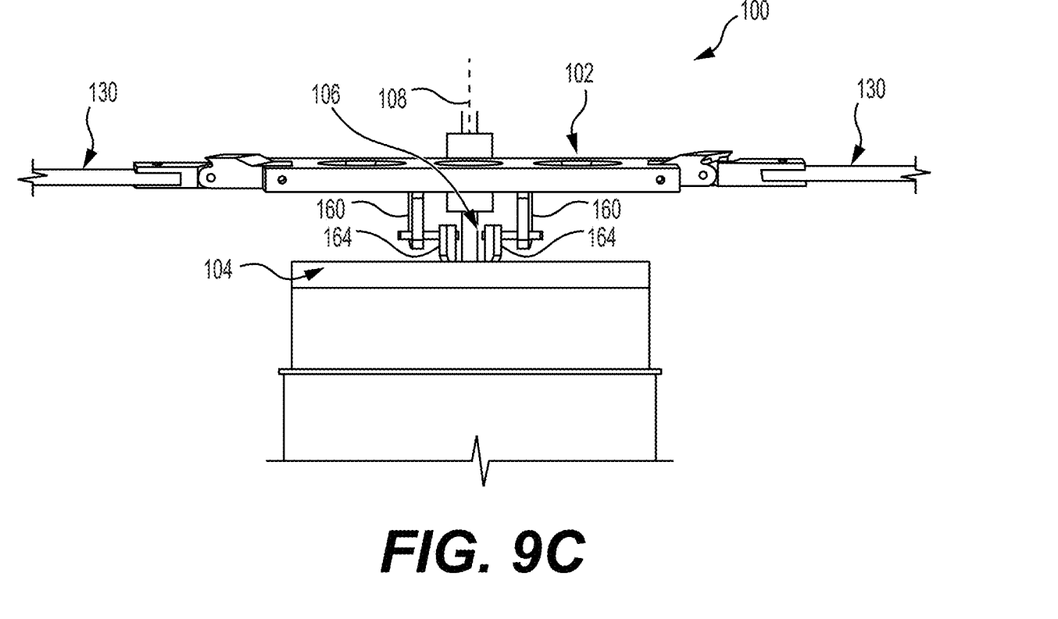
FIG. 9C is a side view of the rotor control device of FIG. 1 in which the swashplate is moved in a first direction from the neutral position and the hub is rotated to a first position.
Figure 9D:
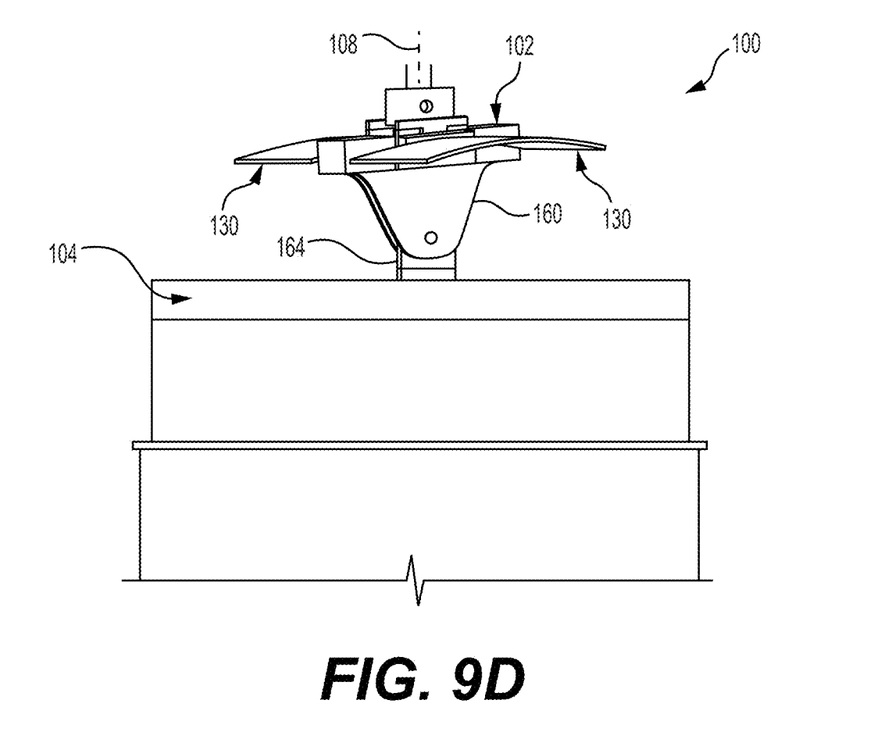
FIG. 9D is another side view of the rotor control device of FIG. 1 in which the swashplate is moved in the first direction from the neutral position and the hub is rotated to the first position, like in FIG. 9C.

When the swashplate 104 is moved a first distance in a first direction along the swashplate plane 156 relative to the central location, as shown in FIGS. 9C and 9D, the second pitch control components 164 cause the first pitch control components 162 to hinge the hub body 110 and blades 130 about the hub axis 120 when the hub 102 is positioned such that a projection of the hub axis 120 onto the swashplate plane 156 is perpendicular to the first direction. The hinging of the hub body 110 and blades 130 in this position causes the pitch of the first blade 130 to increase and the pitch of the second blade 130 to decrease. The increased pitch of the first blade 130 and the decreased pitch of the second blade 130 create a combined lateral force that alters the trajectory of the descent of the device 100 in an alteration direction.

Figure 9E:
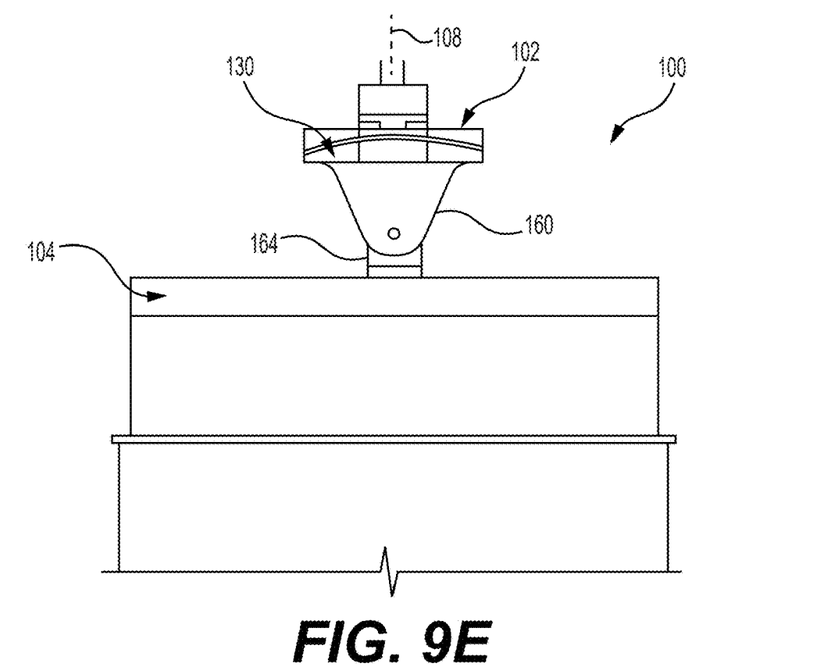
FIG. 9E is a side view of the rotor control device of FIG. 1 in which the swashplate is moved in the first direction from the neutral position and the hub is rotated to a second position.

As the hub 102 continues to rotate 90 degrees, as shown moving from 0 degrees in FIG. 9C to 90 degrees in FIG. 9E, such that the projection of the hub axis 120 onto the swashplate plane 156 is parallel to the first direction, the pins 162 of the first pitch control components 160 are able to slide in the grooves 166 of the second pitch control components 164 allowing the hub body 110 and blades 130 to hinge about the hub axis 120 back to the neutral position. Because the pitches of the first blade 130 and the second blade 130 are equal, the blades 130 do not alter the trajectory of the descent of the device 100 in this position.

As the hub 102 continues to rotate an additional 90 degrees (i.e., a total of 180 degrees) such that the projection of the hub axis 120 onto the swashplate plane 156 is again perpendicular to the first direction, the second pitch control components 164 cause the first pitch control components 160 to hinge the hub body 110 and blades 130 about the hub axis 120. Since the total rotation of the two symmetrical blades 130 is 180 degrees, the pitch of the blades 130 appears the same as shown in FIGS. 9C and 9D although the blades 130 have switched sides. In this position, the hinging of the hub body 110 and blades 130 causes the pitch of the second blade 130 to increase and the pitch of the first blade 130 to decrease. The increased pitch of the second blade 130 and the decreased pitch of the first blade 130 create a combined lateral force that again alters the trajectory of the descent of the device 100 in the alteration direction.

As the hub 102 continues to rotate an additional 90 degrees (i.e., a total of 270 degrees) such that the projection of the hub axis 120 onto the swashplate plane 156 is again parallel to the first direction, the hub body 110 and blades 130 are again allowed to hinge about the hub axis 120 back to the neutral position such that the blades 130 do not alter the trajectory of the descent of the device 100, similar to the position shown in FIG. 9E.

Because the pitch of the blades 130 periodically hinge between the neutral position and a position that alters the trajectory of the descent of the device in the alteration direction, the device 100 will descend along the altered trajectory.

If the swashplate 104 is moved the same first distance in a second direction along the swashplate plane 156 relative to the central location, the pitch of the blades 130 will periodically hinge between the neutral position and a position that alters the trajectory of the descent of the device in an alteration direction, causing the device 100 to descend along an altered trajectory. Thus, the direction of the trajectory of the descent of the device 100 can be altered by changing the directional position of the swashplate 104 relative to the central location.

If the swashplate 104 is moved in the first direction along the swashplate plane 156 relative to the central location, but to a second distance that is further from the central location than the first distance, then the second pitch control components 164 will cause the first pitch control components 160 to periodically hinge the hub body 110 and blades 130 further about the hub axis 120 than at the first distance. The pitch of the blades 130 will, therefore, periodically increase and decrease to a higher degree at the second distance than at the first distance, causing a combined lateral force that alters the trajectory of the descent of the device 100 in an alteration direction at a magnitude that is greater than when the swashplate 104 is at the first distance. Thus, the magnitude of the alteration of the trajectory of the descent of the device 100 can be altered by changing the distance of the swashplate 104 relative to the central location.

The swashplate opening 152 and swashplate guide 154 are sized such that the swashplate 104 can move along the swashplate plane 156 enough to allow the hub 102 and blades 130 to hinge about the hub axis 120 up to 30 degrees relative to the swashplate plane 156 as the hub 102 rotates about the rotational axis 108. However, in other implementations, the swashplate opening and swashplate guide are sized such that the swashplate can move along the swashplate plane enough to allow the hub and blades to hinge up to any number of degrees relative to the swashplate plane as the hub rotates about the rotational axis.

The controller 200 is used to control the servo motors 170 to change the direction and magnitude of the alteration of the trajectory of the descent of the device 100, as described above. The controller 200 includes a processor 202 and a system memory 204. The processor 202 executes computer-readable instructions stored on the system memory 204 to cause the rotation of the output shafts 172 of the servo motors 170, and thus, the movement of the swashplate 104 along the swashplate plane 156.

The device 100 also includes an inertial measurement unit 206, an altimeter 208, a global positional system (GPS) 210, and a camera 212, each of which are in operable communication with the processor 202. The processor 202 receives an input signal from the inertial measurement unit 206, the altimeter 208, the GPS 210, and the camera 212, and the processor 202 causes the swashplate 104 to move along the swashplate plane 156 based on the input signal such that the trajectory of the device 100 can be altered autonomously. Coordinates for a predetermined landing zone of the device 100 can be entered into the GPS 210, and input to the controller 200 from the inertial measurement unit 206, the altimeter 208, the GPS 210, and the camera 212 can be used to determine the location of the device 100. Based on these location inputs, the controller 200 can then cause the swashplate 104 to move along the swashplate plane 156 to alter the trajectory of the descent of the device 100 such that the device 100 will land in the predetermined landing zone.

Although the device 100 shown in FIGS. 1-9E is fully autonomous, in other implementations, the device is controllable remotely. In such implementations, the device further includes a receiver in operable communication with the processor. A signal can be sent remotely to the receiver, and the receiver then sends an input signal to the processor. The processor then causes the swashplate to move along the swashplate plane based on the input signal.

It should be appreciated that the logical operations described herein with respect to the various figures may be implemented (1) as a sequence of computer implemented acts or program modules (i.e., software) running on a computing device (e.g., the computing device described in FIG. 10), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 10:
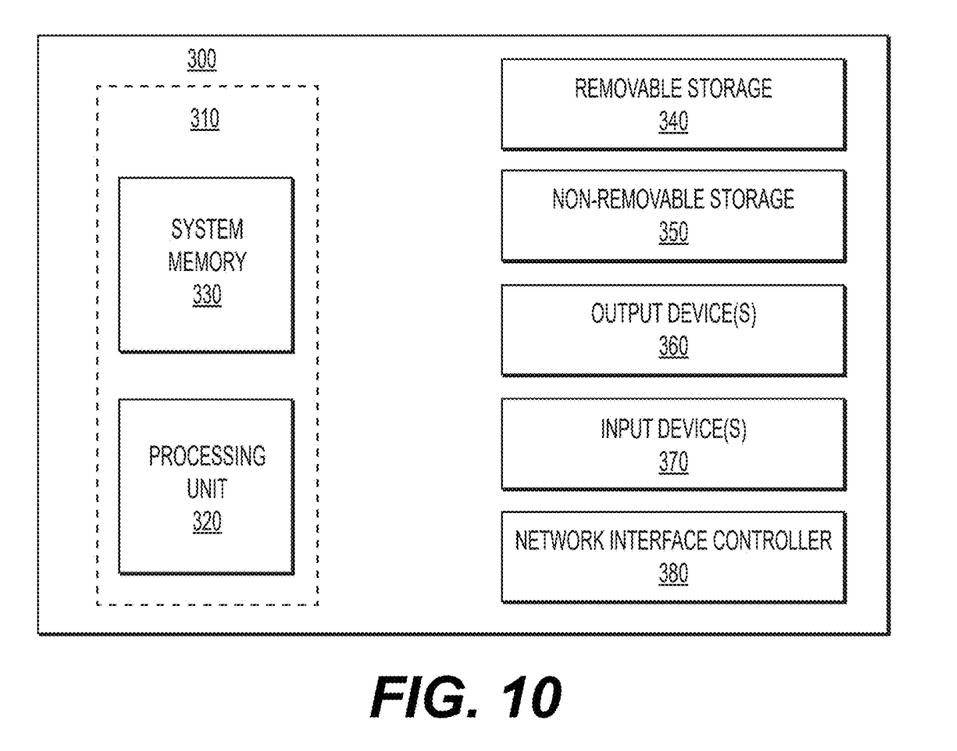
FIG. 10 is an exemplary computer system suitable for implementation one or more controllers.

Referring to FIG. 10, an example computing device 300 upon which embodiments of the invention may be implemented is illustrated. For example, the controller system 200 described herein may each be implemented as a computing device, such as computing device 300. It should be understood that the example computing device 300 is only one example of a suitable computing environment upon which embodiments of the invention may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 300 to provide the functionality of a number of servers that is not directly bound to the number of computers in the computing device 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 300 typically includes at least one processing unit 320 and system memory 330. Depending on the exact configuration and type of computing device, system memory 330 may be volatile (such as random access memory (RAM)), non-volatile (such as read-only memory (ROM), flash memory, etc.), or some combination of the two. This most basic configuration is illustrated in FIG. 10 by dashed line 310. The processing unit 320 may be a standard programmable processor that performs arithmetic and logic operations necessary for operation of the computing device 300. While only one processing unit 320 is shown, multiple processors may be present. Thus, while instructions may be discussed as executed by a processor, the instructions may be executed simultaneously, serially, or otherwise executed by one or multiple processors. The computing device 300 may also include a bus or other communication mechanism for communicating information among various components of the computing device 300.

Computing device 300 may have additional features/ functionality. For example, computing device 300 may include additional storage such as removable storage 340 and non-removable storage 350 including, but not limited to, magnetic or optical disks or tapes. Computing device 300 may also contain network connection(s) 380 that allow the device to communicate with other devices such as over the communication pathways described herein. The network connection(s) 380 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 300 may also have input device(s) 370 such as a keyboards, keypads, switches, dials, mice, track balls, touch screens, voice recognizers, card readers, paper tape readers, or other well-known input devices. Output device(s) 360 such as a printers, video monitors, liquid crystal displays (LCDs), touch screen displays, displays, speakers, etc. may also be included. The additional devices may be connected to the bus in order to facilitate communication of data among the components of the computing device 300. All these devices are well known in the art and need not be discussed at length here.

The processing unit 320 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 320 for execution. Example tangible, computer-readable media may include, but is not limited to, volatile media, non-volatile media, removable media and non-removable media implemented in any method or technology for storage of information such as computer readable instructions, data structures, program modules or other data. System memory 330, removable storage 340, and non-removable storage 350 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 320 may execute program code stored in the system memory 330. For example, the bus may carry data to the system memory 330, from which the processing unit 320 receives and executes instructions. The data received by the system memory 330 may optionally be stored on the removable storage 340 or the non-removable storage 350 before or after execution by the processing unit 320.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise.

The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A rotor control device comprising:
    a rotational axis;
    a shaft extending along the rotational axis;
    a hub having a hub axis, the hub being hingedly coupled to the shaft such that the hub axis is perpendicular to the rotational axis and stationary relative to the shaft, wherein the hub is hingable about the hub axis relative to the rotational axis;
    at least one first pitch control component coupled to the hub;
    a swashplate guide spaced a fixed distance from the hub axis along the rotational axis; and
    a swashplate slidably captured within the swashplate guide, the swashplate having at least one second pitch control component hingedly engaging the at least one first pitch control component, wherein the swashplate is movable within a swashplate plane transverse to the rotational axis and the swashplate guide inhibits the swashplate from moving transverse to the swashplate plane,
    wherein the shaft is rotatable about the rotational axis relative to the swashplate, and
    wherein movement of the swashplate within the swashplate plane relative to the rotational axis causes the hub to periodically hinge about the hub axis as the hub rotates about the rotational axis.

2. The rotor control device of claim 1, further comprising one or more blades coupled to the hub and extendable along the hub axis.

3. The rotor control device of claim 2, wherein the one or more blades includes two blades.

4. The rotor control device of claim 2, wherein each of the one or more blades is hingedly coupled to the hub.

5. The rotor control device of claim 4, wherein each of the one or more blades includes a first blade hinge and a second blade hinge, wherein the first blade hinge is coupled to the hub, the second blade hinge is coupled to the first blade hinge, and the blade is coupled to the second blade hinge.

6. The rotor control device of claim 1, further comprising at least one servo for moving the swashplate along the swashplate plane.

7. The rotor control device of claim 6, wherein the at least one servo includes two servos.

8. The rotor control device of claim 1, wherein the at least one first pitch control component includes two first pitch control components and the at least one second pitch control component includes two second pitch control components.

9. The rotor control device of claim 1, wherein one of the first pitch control component and the second pitch control component includes at least one pin extending transverse to the rotational axis and the other of the second pitch control component and the first pitch control component includes at least one slot for slidingly and hingedly receiving the at least one pin.

10. The rotor control device of claim 1, wherein the swashplate includes an outer body and an inner body, wherein the inner body is rotatable about the rotational axis relative to the outer body, wherein the at least one second pitch control component extends from the inner body.

11. The rotor control device of claim 10, wherein the inner body defines a swashplate opening through which the shaft extends.

12. The rotor control device of claim 11, wherein the swashplate opening is sized such that the swashplate can move along the swashplate plane enough to allow the hub to hinge up to 30 degrees relative to the swashplate plane as the hub rotates about the rotational axis.

13. The rotor control device of claim 1, further comprising a controller, wherein the controller includes a processor and a system memory, wherein the processor executes computer-readable instructions stored on the system memory, the instructions causing the processor to cause the swashplate to move along the swashplate plane.

14. The rotor control device of claim 13, further comprising an inertial measurement unit in operable communication with the processor, wherein the processor receives an input signal from the inertial measurement unit, and the processor causes the swashplate to move along the swashplate plane based on the input signal.

15. The rotor control device of claim 13, further comprising an altimeter in operable communication with the processor, wherein the processor receives an input signal from the altimeter, and the processor causes the swashplate to move along the swashplate plane based on the input signal.

16. The rotor control device of claim 13, further comprising a global positional system (GPS) in operable communication with the processor, wherein the processor receives an input signal from the GPS, and the processor causes the swashplate to move along the swashplate plane based on the input signal.

17. The rotor control device of claim 13, further comprising a camera in operable communication with the processor, wherein the processor receives an input signal from the camera, and the processor causes the swashplate to move along the swashplate plane based on the input signal.

18. The rotor control device of claim 13, further comprising a receiver in operable communication with the processor, wherein the processor receives an input signal from the receiver, and the processor causes the swashplate to move along the swashplate plane based on the input signal.

19. An autorotative system comprising:
a main body; and
a rotor control device according to claim 1 coupled to the main body,
wherein the shaft and the hub are rotatable relative to the main body, and
wherein the swashplate is non-rotatable relative to the main body.

20. The rotor control device of claim 1, further comprising a motor for causing the shaft to rotate about the rotational axis.

* * * * *